United States Patent [19]
Riviére

[11] Patent Number: 6,126,364
[45] Date of Patent: Oct. 3, 2000

[54] REAMER HAVING SPRING-BIASED INSERT CLAMPS

[75] Inventor: Bertrand Riviére, Bourges, France

[73] Assignee: Seco Tools AB, Fagersta, Sweden

[21] Appl. No.: 09/285,682

[22] Filed: Apr. 5, 1999

[30] Foreign Application Priority Data

Apr. 7, 1998 [SE] Sweden ................................ 9801211

[51] Int. Cl.⁷ .................................................. B23P 15/42
[52] U.S. Cl. ................................ 407/15; 407/37; 407/41; 407/47; 407/49
[58] Field of Search ............................ 407/15, 13, 16, 407/18, 19, 40, 41, 47, 49, 37, 38, 102, 112, 117

[56] References Cited

U.S. PATENT DOCUMENTS

| | | | |
|---|---|---|---|
| 2,144,986 | 1/1939 | Miller | 407/41 X |
| 2,435,287 | 2/1948 | Miller | 407/37 |
| 3,126,611 | 3/1964 | Wiles . | |
| 3,460,220 | 8/1969 | Connelly . | |
| 3,526,025 | 9/1970 | Sletten . | |
| 4,487,532 | 12/1984 | Hamilton | 407/41 X |
| 4,993,889 | 2/1991 | Kelm | 407/13 X |

FOREIGN PATENT DOCUMENTS

| | | | |
|---|---|---|---|
| 1210037 | 3/1960 | France | 407/112 |
| 2 044 150 | 10/1980 | United Kingdom . | |

*Primary Examiner*—Henry W. H. Tsai
*Attorney, Agent, or Firm*—Burns, Doane, Swecker & Mathis, L.L.P.

[57] ABSTRACT

A reamer for chip removing machining includes a holder having a line of pockets, each pocket including a support surface facing in a direction of feed of the holder. Cutting inserts are mounted in respective ones of the pockets and project out of the pocket at progressively greater distances. Clamping assemblies clamp respective inserts in their respective pockets. Each clamping assembly includes a shank projecting into a hole formed in the pocket, a clamping head fixed to the shank and situated in the pocket, and a spring yieldably biasing the shank and the clamping head to a position wherein the clamping head forces a rear surface of the insert against the support surface. By depressing a shank against its spring bias, a respective insert can be replaced.

9 Claims, 3 Drawing Sheets

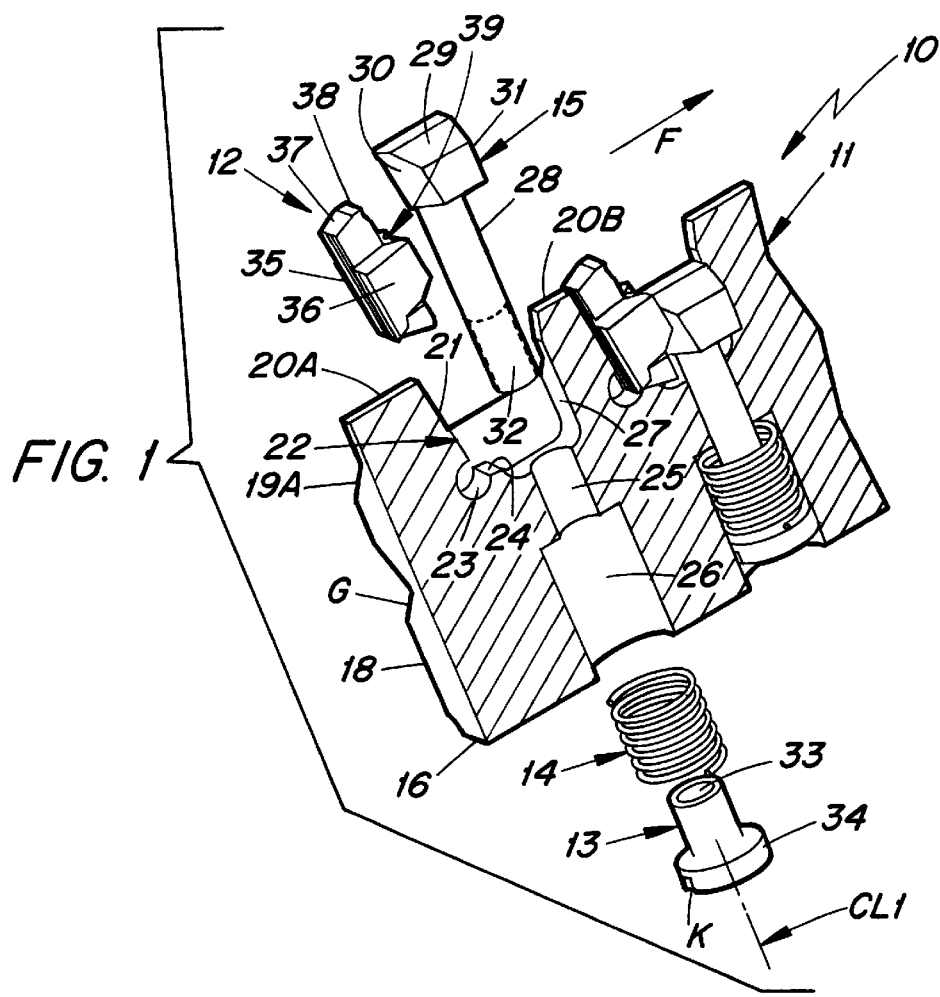
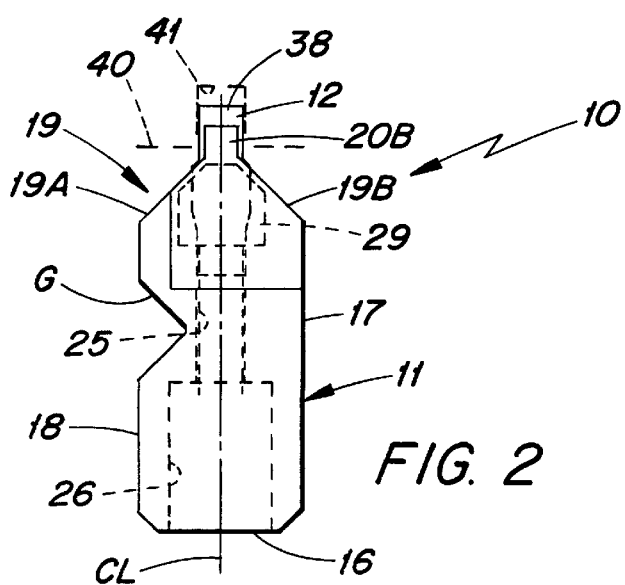

REAMER HAVING SPRING-BIASED INSERT CLAMPS

FIELD OF THE INVENTION

The present invention relates to a reamer or broach for chip removing machining of metallic workpieces, wherein cutting inserts project at progressively increasing distances from a holder.

PRIOR ART

In British Document 2,044,150 a prior art reamer is described which is intended to ream slots and like openings in metallic work-pieces. The known reamer brings about a number of relative advantages, for example, as regards the life span of the tool. The known reamer comprises a number of cutting units that are influenced by a common fastening device. During the exchange of a cutting unit, the positions of all units are thus influenced. Furthermore, many operations are required in order to change one cutting unit.

OBJECTS OF THE INVENTION

One object of the present Invention Is to provide a reamer having the advantages of the prior art.

Another object of the present Invention is to provide a reamer with easily interchangeable cutting inserts.

Another object of the present invention is to provide a reamer with quickly interchangeable cutting inserts.

Another object of the present invention is to provide a rigid reamer for narrow cutting inserts.

Still another object of the present invention is to provide a reamer where the clamping force on the cutting Insert is distributed over a large surface such that the cutting insert does not promote splitting.

Still another object of the present invention is to provide a reamer where torsion of the cutting insert during machining is avoided.

Still another object of the present invention is to provide a reamer with great resistance against accidental extraction of the cutting insert from the holder.

Still another object of the present invention is to provide a reamer where the cutting insert is more easily guided into the cutting insert pocket during mounting.

These and other objects have been achieved by a reamer which comprises a holder forming a line of pockets. Each pocket includes a support surface facing in a direction of feed of the holder. Cutting inserts are mounted in respective ones of the pockets, whereby the inserts project out of the pockets at progressively greater distances. Clamping assemblies are provided for clamping respective inserts in their respective pockets. Each clamping assembly comprises a shank projecting into a hole formed in the pocket, a clamping head fixed to the shank and situated in the pocket, and a spring yieldably biasing the shank and the clamping head to a position wherein the clamping head forces a rear surface of the insert against the support surface.

The invention also pertains to the combination of the holder and the clamping assemblies.

DESCRIPTION OF THE DRAWINGS

The objects and advantages of the invention will become apparent from the following detailed description of a preferred embodiment thereof in connection with the accompanying drawing in which like numerals designate like elements, and in which:

FIG. 1 shows a longitudinal section of a part of a reamer according to the present invention in an exploded perspective view;

FIG. 2 shows the reamer in an end view;

DETAILED DESCRIPTION OF A PREFERRED EMBODIMENT OF THE INVENTION

Figure 3A:
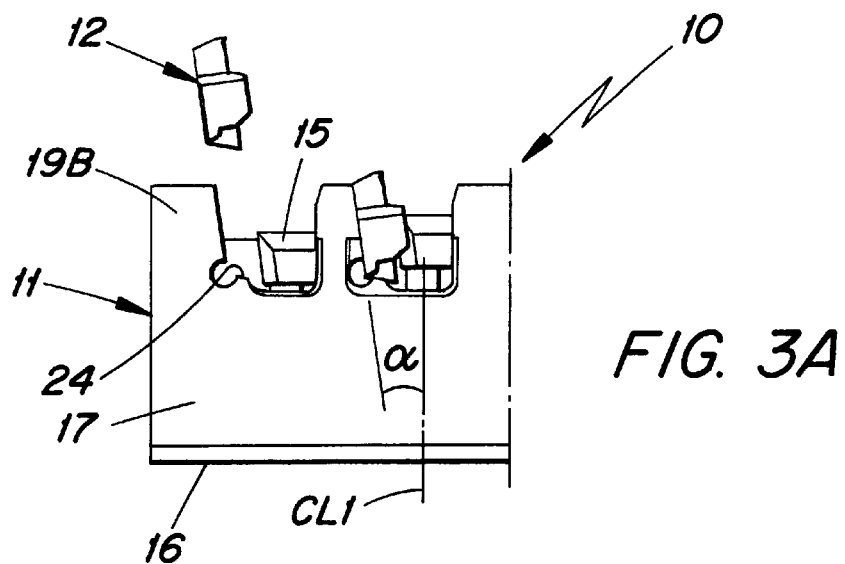
FIG. 3A shows a part of the reamer during a first in a sequence of steps for the mounting of a cutting insert.

With reference to FIGS. 1 and 2 a reamer or broach 10 is shown, including an elongated holder 11 or an elongated holder segment and a line of cutting inserts 12. The number of cutting inserts 12 is preferably more than twenty, and they project from the holder at successively increasing distances, whereby the inserts gradually cut a slot to a desired size as the reamer is passed linearly through a metallic workpiece 40 (see FIG. 2). The holder 11 comprises a number of insert pockets. The holder 11 is further provided with a number of insert clamping assemblies, each including a nut 13, a spring 14 and a clamp 15. The reamer has a feed direction F relative to the work piece 40.

Figure 4:
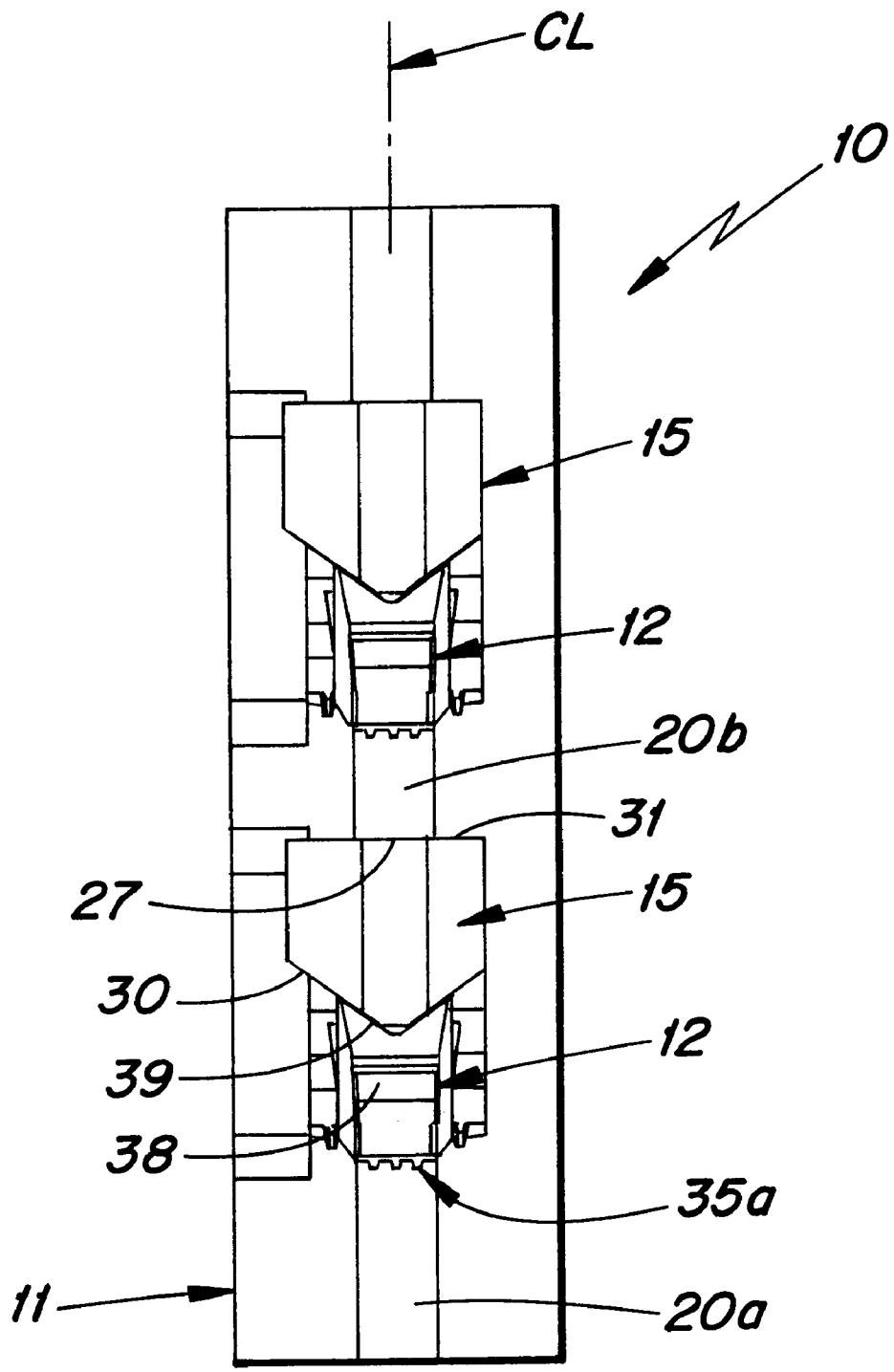
FIG. 4 shows a plan view of an insert in the reamer.

It is apparent from FIG. 2 that the holder 11 has a substantially rectangular basic shape including a base 16, parallel side faces 17 and 18 as well as an upper side 19. One of the side faces 18 includes a longitudinal V-shaped groove G for clamping. The upper side 19 comprises inclined surfaces 19a and 19b which are substantially perpendicular to each other and which connect to a centrally arranged support portion 20a. The surfaces 19a, 19b, and the support portion 20a are arranged symmetrically about the vertical axis CL of the segment 10. The support portion 20a has a forward end in the feed direction, which constitutes a support surface 21 in a cutting insert pocket 22. The cutting insert pocket 22 opens laterally outwardly towards the side surface 17 for reasons of accessibility. The support surface 21 is provided with a number of identical grooves extending along the entire support surface 21 in a direction parallel to the vertical axis CL. The grooves are spaced from each other, and each groove has a cross section which describes a substantially trapezoidal shape. The grooves are intended to mate with corresponding ridges formed on each cutting insert 12, as will be discussed. The grooves/ridges interlock can be seen in FIG. 4. The number of grooves depends of the width of the support surface 21, which width extends perpendicularly to the feed direction, and the number of grooves is chosen to be in the interval of 2 to 10. The support surface 21 connects via a concave transition surface 23 to an inner or bottom surface 24. The location of the inner surface 24 defines a depth of the insert pocket, and the depth determines the extent to which the respective insert projects from the holder segment. The pockets are of progressively varying depths. That is, the distance from the support portion 20a to the inner surface 24 (which defines the pocket depth) becomes progressively less from one pocket to the next in a direction opposite the feed direction F, whereby the identical inserts 12 project from the pockets by progressively greater distances. For example, the inserts could project from the pockets by distances which increase at 0.1 mm increments.

A hole 25 is provided in front of the inner surface 24, i.e., the hole is spaced from the inner surface in the feed direction. The hole 25, which extends parallel to the axis CL, opens into the pocket at a level below the inner surface 24, and connects to a widened space 26 which exits in the base 16. A planar front wall 27 is provided in front of the hole 25 and extends above that hole. The wall 27 connects to a second support portion 20b. The surface 21 and the wall 27 together form an acute angle α (see FIG. 3C) which is in the range of 6°–20°, preferably less than 10°, and most preferably 8°.

The clamp assembly 15 comprises an elongated, cylindrical shank 28, which connects to a head 29. The head 29 is wedge-shaped as seen in the side views of FIGS. 3A–3C and comprises a V-shaped, convex clamping surface 30 and a planar wall 31. The surface 30 and the wall 31 converge toward the bottom of the insert pocket and form an acute angle with one another which is slightly larger than the above-mentioned angle α. That is, if the angle α is 8°, then the angle formed by surface 30 and wall 31 can be 8°10'. The shank has a threaded end 32. The nut 1 3 has a cylindrical basic shape with an internal threaded hole 33. The nut 13 also comprises a flange portion 34 that defines the greatest diameter of the nut. The latter diameter is greater than the diameter of the spring 14. The inner diameter of the spring is however greater than the diameter of the rest of the nut. A key grip K extends diametrically over the flange portion 34.

The cutting insert 12 has an elongated basic shape and comprises a front surface 39, a rear surface 35 and side surfaces 36, 37, interconnecting the surfaces 39, 35, wherein a line of intersection between the side surface 37 and the front surface 39 forms a cutting edge 38. Although the depicted cutting insert has only one cutting edge, it could alternatively be indexable, that is it can have two cutting edges; one edge at each end. The front surface 39 includes a V-shaped, concave portion. The rear surface 35 is formed with a number of separate, substantially identical ridges extending parallel to the vertical axis CL. The ridges follow a substantially sinusoidal path in a cross section of the insert. The ridges are elongated and extend vertically along the entire rear surface 35. Each ridge further has two flanks, which connect to a valley having a radius of about 0.2 to 0.4 mm. The flanks form an acute angle with each other. The number of ridges depends on the size of the width of the cutting insert, the width extending in the direction of the cutting edge. The number of ridges corresponds to the number of grooves in the support surface 21, namely from 2 to 10.

Figure 3B:
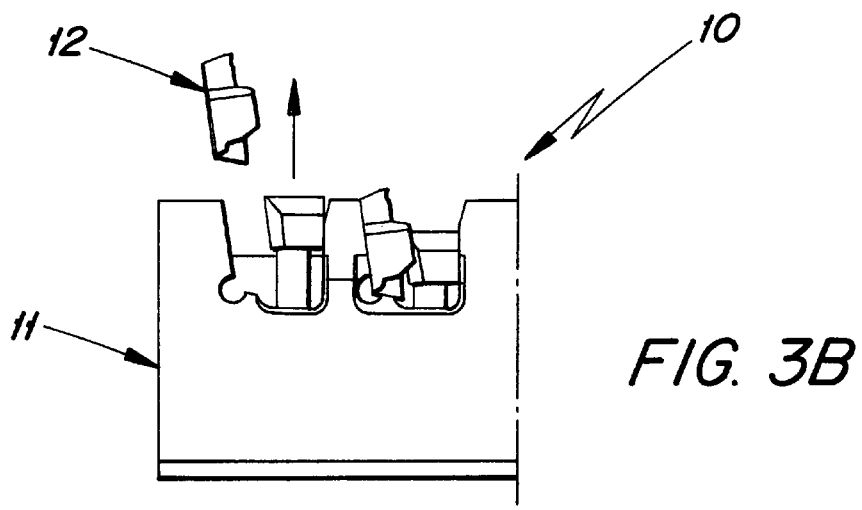
FIG. 3B shows the reamer part in a second step of the mounting sequence.
Figure 3C:
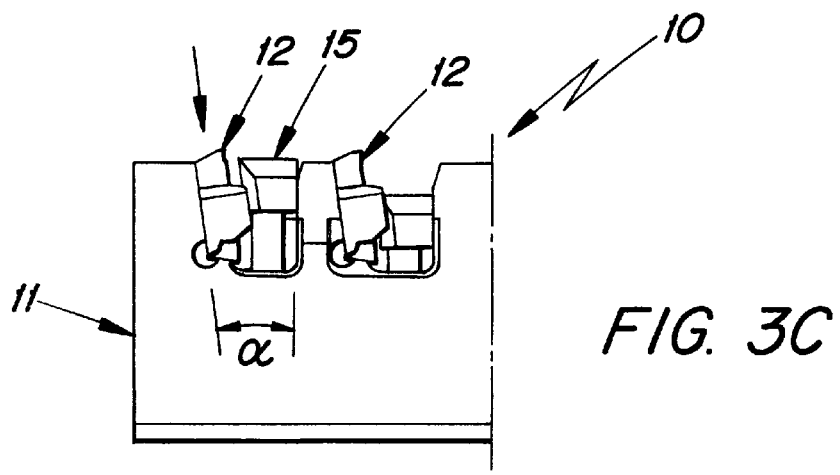
FIG. 3C shows the reamer part in a third step of the mounting sequence.

When assembling the reamer 10 according to the present invention, the clamping assembly 15 is initially mounted, by inserting the threaded end 32 of the shank 28 into the hole 25 until the head 29 rests against the holder. The surfaces 31 and 27 are thus facing each other. Subsequently, the spring 14 is brought over the nut such that one end of the spring rests against the flange portion 34. The nut and the spring are then brought into the space 26, and the screw is firmly threaded onto the shank 28 by means of a screwdriver, for example. That method, which preferably is a once-only event, is repeated for the remaining clamping assemblies. As shown in FIG. 3A, the support surface 21 forms an acute angle α with the center axis CL1 of the clamping assembly. That angle, which is identical to the above-mentioned angle α, is less than 10°. The center axis CL1 of the clamping means preferably coincides with the vertical axis CL of the holder. The clamping surface 30 also forms an acute angle with the center axis CL1 of the clamping means, FIGS. 3A–3C. The latter angle is however slightly greater than the angle α, in order to attain accurately positioned abutment areas between the clamp and the cutting insert.

Subsequently, the nut 13 is pushed manually upwardly within the space 26, whereby the head 29 is raised to expand the accessible space for the cutting insert.

While the nut is thus depressed, the cutting insert 12 is aligned with the holder and is partially inserted such that the associated ridges and grooves of the surfaces 21, 35 come into meshing engagement with each other. Then the cutting insert is further inserted, which insertion is guided by said meshed grooves/ridges while the cutting insert is held by hand against the support surface 21. Eventually, the bottom of the cutting insert abuts against the inner surface 24. Then the nut 13 is released, whereupon the spring 14 pushes the shank and head 28, 29 downwardly. Accordingly, the flanks of the clamping surface 30 abut against the associated flanks of the concave portion of the front surface 39 of the cutting insert while the walls 27, 31 bear against each other, such that the ridges are firmly pressed against the grooves. Thus, the head 29 of the clamp 15 is firmly wedged between the wall 27 and the cutting insert. The spring 14 acts between the flange portion 34 and and the hole 26 to urge the head 29 into abutment with the cutting insert. The clamp 15 assembly has an operative position shown to the right in FIGS. 3A to 3C and an inoperative position as shown to the left in FIGS. 3B and 3C.

The remaining cutting inserts are firmly clamped in the same manner.

Since the inserts 12 project from the pockets by progressively increasing amounts in a direction opposite the feed direction F (e.g., by 0.1 mm increments), each cutting insert successively cuts a deeper slot in the workpiece 40, such that a groove 41 can be formed in the work piece during broaching.

The inserts can be removed by loosening the clamping assemblies 15.

The present invention thus relates to a highly stable reamer for chip removing machining, wherein the cutting inserts can be quickly and simply replaced. The design of the reamer ensures that the clamping force on the cutting insert is distributed over a relatively large surface such that the cutting insert does not risk splitting. In addition the grooves and the ridges ensure that the cutting insert has a resistance against accidental extraction from the cutting insert pocket of about 3.5 times greater than a cutting insert of a conventional reamer.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A reamer for chip removing machining of metal workpieces, the reamer comprising:

a holder forming a plurality of pockets arranged sequentially in a direction of feed of the holder, a plurality of cutting inserts mounted in respective ones of the pockets and projecting out of the pockets at progressively greater distances; and a plurality of clamping assemblies for clamping respective inserts in their respective pockets, each clamping assembly comprising a shank projecting into a hole formed in the pocket, a clamping head fixed to the shank and situated in the pocket, and a spring yieldably biasing the shank and the clamping head to a position wherein the clamping head forces a rear surface of the insert against the support surface.

2. The reamer according to claim 1 wherein each of the rear surface and the support surface is profiled to be of complementary non-planar shape, to lock the insert against movement in a direction perpendicularly to an axis of the shank.

3. The reamer according to claim 2 wherein the rear surface and the support surface have generally V-shaped grooves and projections intermeshed with one another.

4. The reamer according to claim 1 wherein each pocket includes a front surface facing the support surface of the pocket, the clamping head being wedged between the front surface of the pocket and a front surface of the insert.

5. The reamer according to claim 1 wherein the support surface of each pocket forms an acute angle with a center axis of a respective shank when the respective clamping assembly clamps a cutting insert in the pocket.

6. The reamer according to claim 1 wherein each insert includes a front surface, and the respective clamping head includes a clamping surface engaging the front surface of the insert, the clamping surface and the front surface of the insert being locked together by a groove-and-projection structure which prevents movement of the insert in a direction perpendicular to an axis of the shank.

7. The reamer according to claim 2 wherein each insert includes a front surface, and the respective clamping head includes a clamping surface engaging the front surface of the insert, the clamping surface and the front surface of the insert being locked together by a groove-and-projection structure which prevents movement of the insert in a direction perpendicular to an axis of the shank.

8. In combination, a holder and a plurality of clamping assemblies for use in a reamer for chip removing machining of metal workpieces;

the holder forming a plurality of pockets arranged sequentially in a direction of feed of the holder and adapted to receive respective cutting inserts, each pocket including a support surface facing in [a] the direction of feed, and a bottom disposed at a lower end of the support surface, the bottom including an inner surface defining a depth of the groove, the grooves being of progressively decreasing depth for projecting cutting inserts at progressively greater distances from the pockets;

each clamping assembly comprising a shank projecting into a hole formed in the pocket, a clamping head fixed to the shank and situated in the pocket, and a spring yieldably biasing the shank and the clamping head toward the groove bottom to a position in which the clamping head is adapted to force an insert against the support surface.

9. The combination according to claim 8 wherein the support surface includes a plurality of parallel grooves extending downwardly toward the inner surface.

* * * * *